US008418386B1

(12) United States Patent  (10) Patent No.: US 8,418,386 B1
Key et al.  (45) Date of Patent: Apr. 16, 2013

(54) MOBILE VEHICLE DISPLAY DEVICE

(75) Inventors: David Key, Houston, TX (US); Dan Matheus, Fort Worth, TX (US); Marc A. Meadows, Fort Worth, TX (US); Jayton Cagle, Forth Worth, TX (US)

(73) Assignee: D2 Auto Group LLC, Houston, TX (US)

( * ) Notice: Subject to any disclaimer, the term of this patent is extended or adjusted under 35 U.S.C. 154(b) by 156 days.

(21) Appl. No.: 12/907,564

(22) Filed: Oct. 19, 2010

(51) Int. Cl.
 *G09F 21/04* (2006.01)
(52) U.S. Cl.
 USPC ............ 40/590; 296/21; 410/24; 40/591; 414/495
(58) Field of Classification Search ............ 40/590, 40/601; 182/69.3, 63.1, 127; 296/21; 410/24
 See application file for complete search history.

(56) References Cited

U.S. PATENT DOCUMENTS

| | | | |
|---|---|---|---|
| 2,945,551 A | 7/1960 | Annin et al. | |
| 3,168,206 A * | 2/1965 | Washington | 410/50 |
| 3,718,227 A * | 2/1973 | Swift | 414/495 |
| 3,820,631 A * | 6/1974 | King | 182/141 |
| 3,931,895 A | 1/1976 | Grimaldo | |
| 4,171,120 A | 10/1979 | Clark | |
| 4,657,520 A * | 4/1987 | Sheffer | 446/488 |
| 4,724,875 A | 2/1988 | Baldwin et al. | |
| 4,746,262 A * | 5/1988 | Anderson | 414/495 |
| 4,921,305 A | 5/1990 | Steer | |
| 4,932,830 A * | 6/1990 | Woodburn | 414/495 |
| 5,168,226 A * | 12/1992 | Hinks | 324/309 |
| 5,176,443 A * | 1/1993 | Lin | 362/413 |
| 5,575,591 A | 11/1996 | Vanderklaauw | |
| 5,803,279 A | 9/1998 | Stallbaumer et al. | |
| 6,027,290 A * | 2/2000 | Andre | 410/24 |
| 6,485,237 B1 * | 11/2002 | Sandwith | 410/24 |
| 7,004,286 B2 * | 2/2006 | Fredette | 182/62.5 |
| 7,287,349 B1 * | 10/2007 | MacDonald et al. | 40/591 |
| 7,347,017 B2 * | 3/2008 | Shaffer, Jr. | 40/591 |
| 7,552,683 B2 * | 6/2009 | Hayashi | 104/89 |
| 7,942,461 B2 * | 5/2011 | Cohen et al. | 296/21 |
| 8,038,330 B2 * | 10/2011 | Liu | 362/413 |
| 2002/0148683 A1 * | 10/2002 | Donaldson et al. | 182/69.4 |
| 2002/0182026 A1 * | 12/2002 | Sandwith | 410/24 |
| 2003/0138309 A1 | 7/2003 | Kozak | |
| 2004/0197176 A1 | 10/2004 | Pate | |
| 2005/0210722 A1 * | 9/2005 | Graef et al. | 40/452 |
| 2006/0265922 A1 * | 11/2006 | Shaffer, Jr. | 40/591 |
| 2007/0045046 A1 * | 3/2007 | Hayes | 182/63.1 |
| 2008/0008552 A1 * | 1/2008 | Boydstun et al. | 410/24 |
| 2008/0149420 A1 * | 6/2008 | Cheatham | 182/63.1 |
| 2009/0211129 A1 * | 8/2009 | Bojthe | 40/518 |
| 2010/0328962 A1 * | 12/2010 | Liu | 362/384 |

* cited by examiner

*Primary Examiner* — Joanne Silbermann
*Assistant Examiner* — Shin Kim
(74) *Attorney, Agent, or Firm* — Buskop Law Group, PC; Wendy Buskop

(57) ABSTRACT

One or more mobile vehicle display devices are provided herein. The mobile vehicle display device can include a trailer assembly and an outer housing. The trailer assembly can include a trailer frame, a turntable disposed on a portion of the trailer frame, a rotator adapted to rotate the turntable, and a wheel adapted to support the trailer assembly. Also, a method of using the mobile vehicle display device is provided herein.

20 Claims, 5 Drawing Sheets

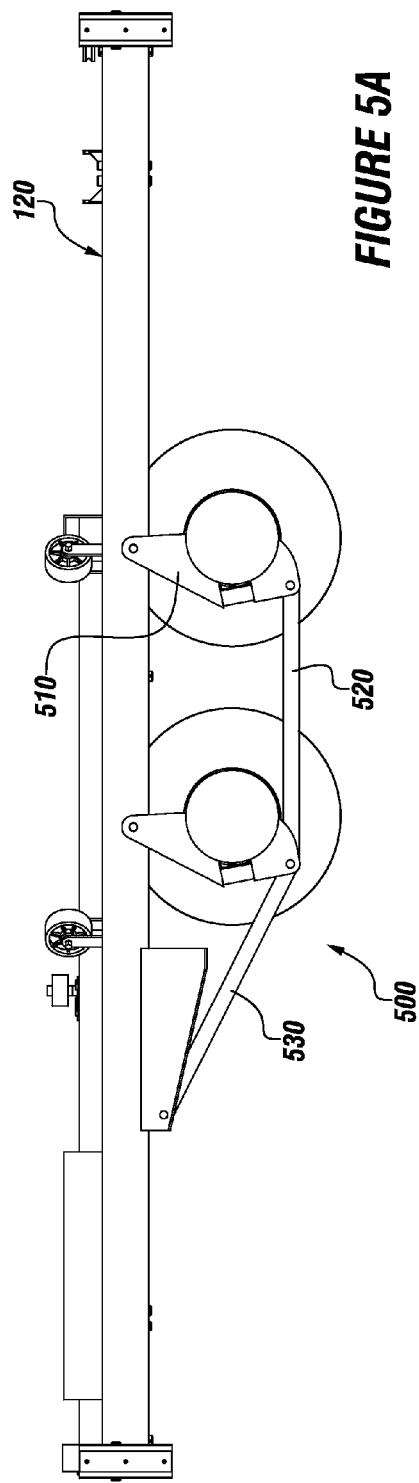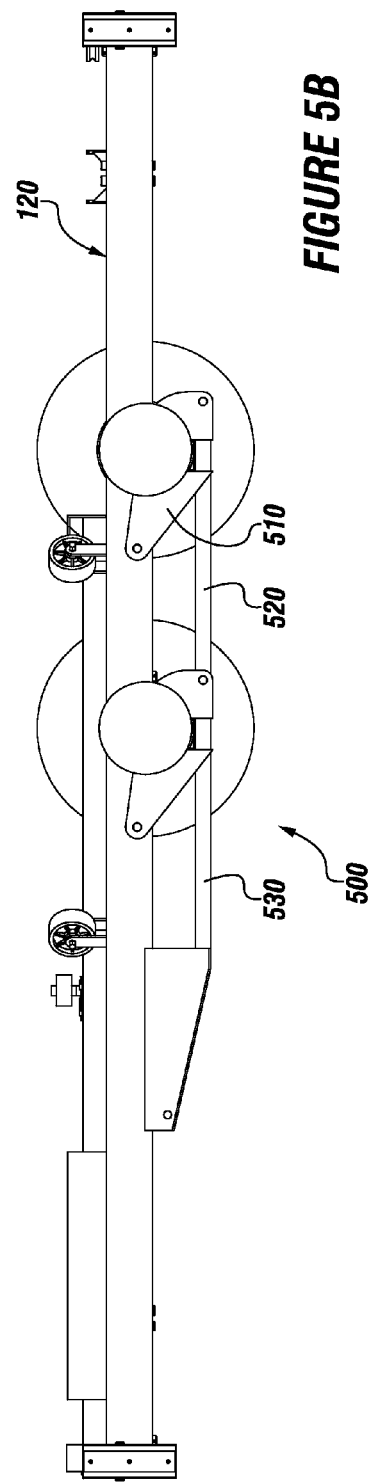

MOBILE VEHICLE DISPLAY DEVICE

FIELD

The present embodiments generally relate to a mobile vehicle display device.

BACKGROUND

A need exists for a mobile vehicle display device that can be easily transported and used to display a vehicle.

A further need exists for a mobile vehicle display device that can display one or more banners, signs, or other objects along with the vehicle.

The present embodiments meet these needs.

BRIEF DESCRIPTION OF THE DRAWINGS

The detailed description will be better understood in conjunction with the accompanying drawings as follows:

FIG. 5A depicts a side view of a wheel lock system when the wheels are in a deployed position according to one or more embodiments.

FIG. 5B depicts a side view of the wheel lock system of FIG. 5A when the wheels are in a retracted position.

Figure 1:
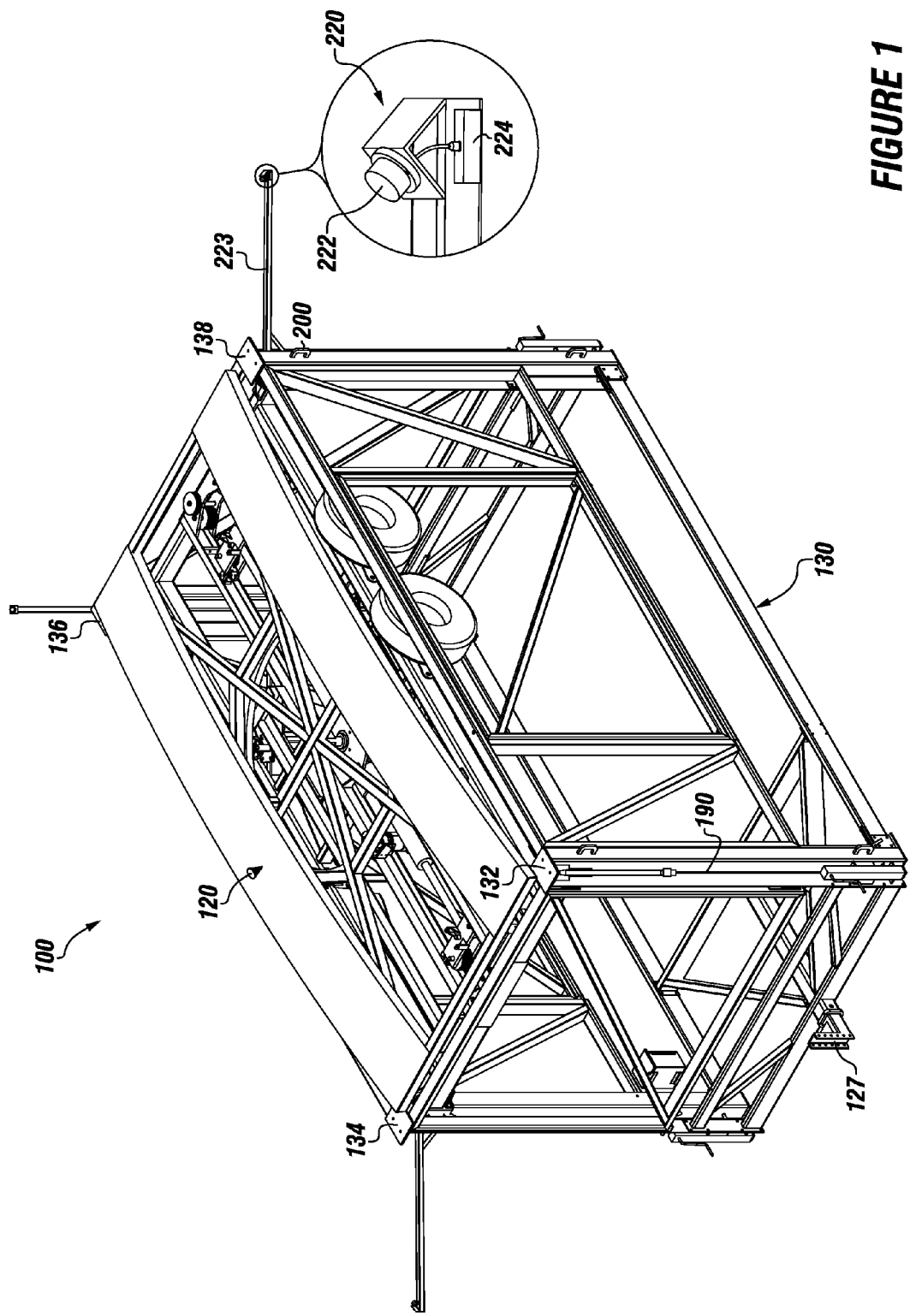
FIG. 1 depicts an isometric view of a mobile vehicle display device according to one or more embodiments.

The present embodiments are detailed below with reference to the listed Figures.

DETAILED DESCRIPTION OF THE EMBODIMENTS

Before explaining the present apparatus and associated method in detail, it is to be understood that the apparatus and method are not limited to the particular embodiments and that the embodiments can be practiced or carried out in various ways.

The present embodiments relate to a mobile vehicle display device. The mobile vehicle display device can include a trailer assembly, a lift device, and an outer housing. The trailer assembly can include a trailer frame and a turntable.

The trailer frame can have four corners. Each corner of the trailer frame can have a guide. Each guide can be secured to the trailer frame by mechanical fasteners, welds, or the like. In one or more embodiments, each guide can be formed onto the trailer frame.

The turntable can be at least partially disposed on the trailer frame. The turntable can be configured to support a vehicle, such as a car, jet ski, truck, boat, or the like. In one or more embodiments, the turntable can have an arched configuration. The arched configuration can prevent a vehicle, such as a car, from becoming high centered on the turntable.

A rotator can be configured to rotate the turntable. In one or more embodiments, the rotator can be driven by a variable speed motor or a constant speed motor. The motor can be electrical, hydraulic, pneumatic, internal combustion, or a combination thereof. The rotator can be configured to slip when counter torque on the turntable is above a predetermined value. The counter torque can be due to high wind. The counter torque can be a function of the vehicles profile along with wind speed.

The trailer assembly can be supported by one or more wheels. For example, four wheels can be used to support the trailer assembly. The wheels can be attached by a system that allows the wheels to retract or lock in place.

A removable hitch can be secured to a portion of the trailer assembly. The removable hitch can be secured to the trailer assembly by a mount, a mechanical fastener, or the like.

The outer housing can be connected to a least a portion of the trailer assembly. For example, the outer housing can have four corners and a post located at each corner. The posts can at least partially extend through the guides. The guides can move vertically about the posts. As such, the trailer assembly can move vertically relative to the outer housing.

The outer housing can also include four walls. The walls can be at least partially supported by the posts. One or more of the walls can be hinged. For example, a wall adjacent to the removable hitch can be hinged, and a wall parallel to the wall adjacent to the removable hitch can also be hinged. This arrangement can allow a car to be placed into the apparatus with minimal set-up time. One or more of the walls perpendicular to the wall adjacent to the removable hitch can also be hinged, thereby allowing doors of a vehicle on the turntable to be opened when the turntable is in a lowered position.

In one or more embodiments, one or more connectors can be disposed on the outer housing. The connectors can secure one or more objects to the outer housing. For example, the connectors can be hook and loop fasteners, snap latches, buttons, hooks, or similar connecting devices. Illustrative objects can include banners, digital display devices, fabric, printed matter, cut outs, adhesive letters, or the like.

The outer housing can also include one or more light assemblies. The light assemblies can be secured to one or more of the posts. The light assemblies can include a light and a light fixture. The light fixture can be retractable for transportation. The mobile vehicle display device can also include a control for actuating the lights. The control can be similar to a light switch or a circuit breaker that can connect an electric circuit between the lights and a power source, such as a wall outlet, a battery, a generator, or the like.

In one or more embodiments, a digital display system can be disposed on or formed into at least a portion of the outer housing. For example, one or more of the walls can have a light emitting diode "LED" or other display device integrated therewith. In one or more embodiments, the digital display device can be remotely operated. For example, the digital display device can have a receiver, remote control, processor, control system, or combinations thereof that can be used to remotely program the digital display system.

A turntable control can be disposed on the outer housing. The turntable control can be used to control the rotator and the turntable. The turntable control can also control movement of the trailer assembly along a z-axis. For example, the turntable control can control the lifting system to raise or lower the turntable. In one or more embodiments, the turntable control can be plug and play with a mount permanently mounted to one of the walls of the outer housing.

In one or more embodiments, the lift system can include four cables disposed through the posts, two plungers, and a plurality of pulleys. For example, four pulleys can be disposed on the trailer frame opposite the plungers, two pulleys can be connected to a synchronizing cable, and one pulley can be disposed on or in each of the posts. In one or more embodiments, a cable can run through each post and engage one or more of the pulleys.

Each corner of the trailer assembly can have a leveling arm connected thereto. The leveling arms can be hydraulic, mechanical, pneumatic, or the like. The leveling arms can be configured to level the trailer assembly when deployed. In one or more embodiments, the leveling arms can be configured to automatically level the trailer assembly. For example, the leveling arms can be hydraulic, and a hydraulic system connected to the trailer can be configured, for example by using flow control devices and pressure regulating devices, to automatically level the trailer assembly. In one or more embodiments, the leveling arms can have one or more sensors to ensure an equal load on each leveling arm.

In one or more embodiments, the lifting system can be a scissor lift, a center lift, one or more telescoping hydraulic cylinders, a jack, a block and tackle lifting system, a rack and pinion lifting system, or the like.

One or more embodiments of the mobile vehicle display device can be used with a method for marketing a vehicle for promotional purposes.

The method can include positioning a mobile vehicle display device at a predetermined location. The predetermined location can be a shopping center, a parking lot, a car dealership, a fair grounds, or a similar place.

The method can include training a person at the location on how to position a vehicle on the turntable, how to operate the rotator to rotate the turntable, and how to raise and lower the turntable.

The method can include displaying an object on the outer housing, positioning lights, or both to draw attention to the vehicle and the mobile vehicle display device. For example, an object such as a banner can be connected to the outer housing, and lights attached to the outer housing can be adjusted to direct light onto the banner and a vehicle being displayed on the mobile vehicle display device.

One or more embodiments of the mobile vehicle display device can be used with a method for loading and lifting a vehicle.

The method can include positioning and leveling the mobile vehicle display device. For example, the mobile vehicle display device can be located in a standard parking space and the wheels of the trailer assembly can be retracted to allow the outer housing to rest on the ground.

The method can also include opening a door of the outer housing adjacent to a removable hitch disposed on the trailer assembly. The door can be a hinged wall of the outer housing.

The method can further include positioning two ramps adjacent to the door. The ramps can be adapted to allow a vehicle to be positioned on the turntable. In addition, the method can include driving the vehicle through the door of the outer housing adjacent to the removable hitch.

The method can further include centering the vehicle on the turntable. The ramps can be removed from the trailer assembly and the vehicle can be elevated. In one or more embodiments, the ramps can be stored on a portion of the trailer assembly. For example, the ramps can be stored on the trailer assembly beneath the rotator.

After the vehicle is elevated, the rotator can be actuated to rotate the turntable allowing for three hundred and sixty degrees of rotation of the vehicle.

The embodiments of the mobile vehicle display device can be best understood with reference to the figures.

Turning to FIG. 1, an isometric view of the mobile vehicle display device 100 is depicted. The mobile vehicle display device 100 can include an outer housing 130, a trailer assembly 120, a removable hitch 127, and a light assembly 220.

The outer housing 130 can include a first post 132, a second post 134, a third post 136, and a fourth post 138. Each post can have a cable disposed in it. For example, a cable 190 is depicted disposed within the first post 132.

The removable hitch 127 can be connected to the trailer assembly 120. For example, the removable hitch 127 can be placed in a receptacle formed on the trailer assembly 120 and secured in place using a mechanical fastener.

The light assembly 220 can include a light fixture 223, which can be connected to the fourth post 138. Each of the posts can have a light fixture connected thereto. The light assembly 220 can include a light 222. The light 222 can be an incandescent light, a colored light, a light emitting diode "LED", or the like. The light 222 can be connected to a control 224. In one or more embodiments, the control 224 can be a switch disposed on the outer housing 130.

One or more connectors 200 can be disposed on the outer housing 130.

Figure 2:
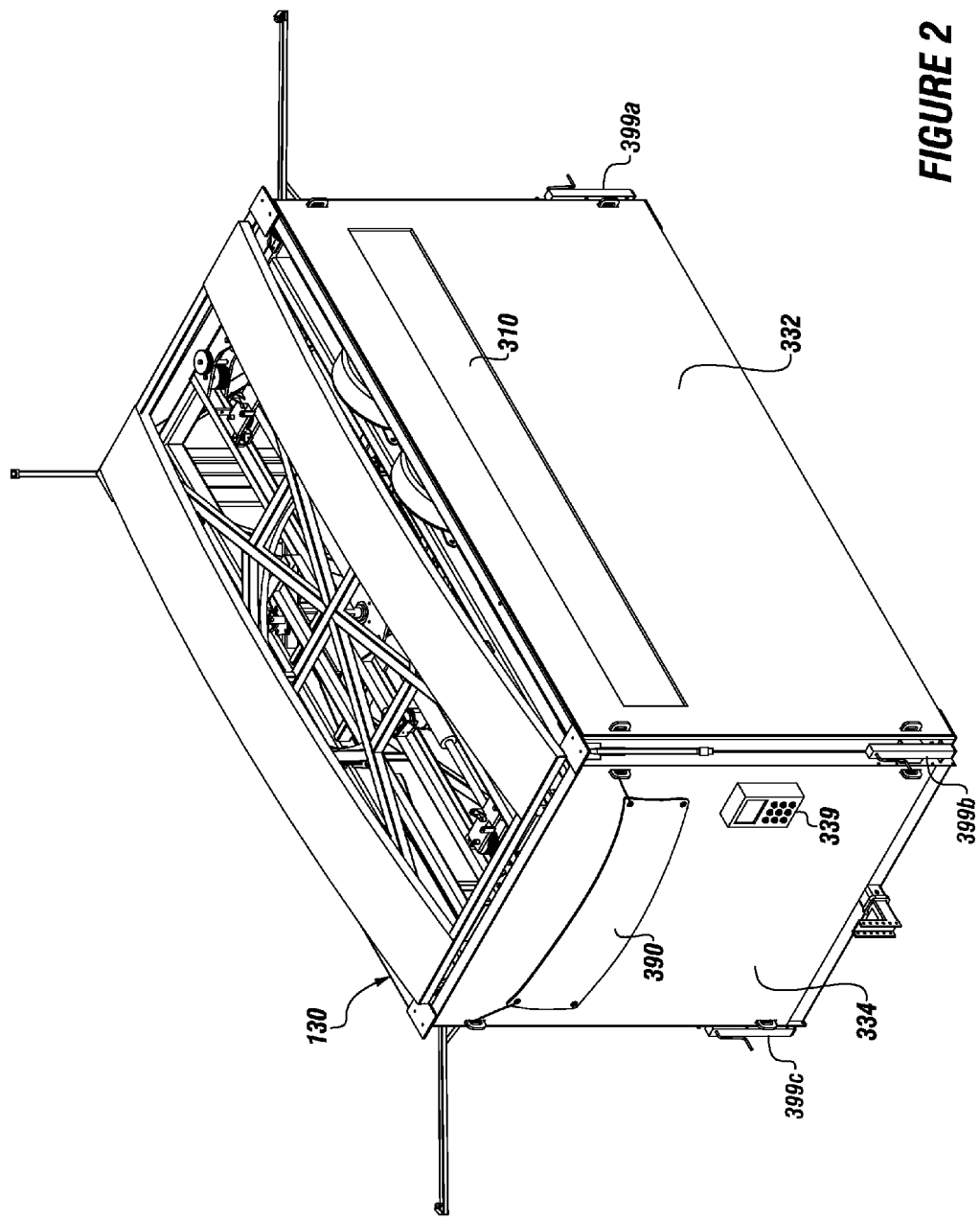
FIG. 2 depicts the mobile vehicle display device of FIG. 1 with walls disposed on an outer housing according to one or more embodiments.

FIG. 2 depicts the mobile vehicle display device of FIG. 1 with one or more walls disposed on the outer housing 130. The outer housing 130 is depicted having a plurality of walls, two are shown as a first wall 332 and a second wall 334. The walls can be supported by the posts. One or more of the walls can be hinged to allow them to open and shut. The first wall 332 is depicted having a digital display 310 connected thereto. Of course, each wall can have one or more digital displays or objects connected thereto.

An object 390 is disposed on the second wall 334. A turntable control 339 is depicted connected to the second wall 334. One or more leveling arms 399a, 399b, and 399c can be connected with the trailer assembly. For example, the leveling arms 399a, 399b, and 399c can be connected on a portion of the outer housing 130, and the outer housing 130 can be connected with the trailer assembly.

Figure 3:
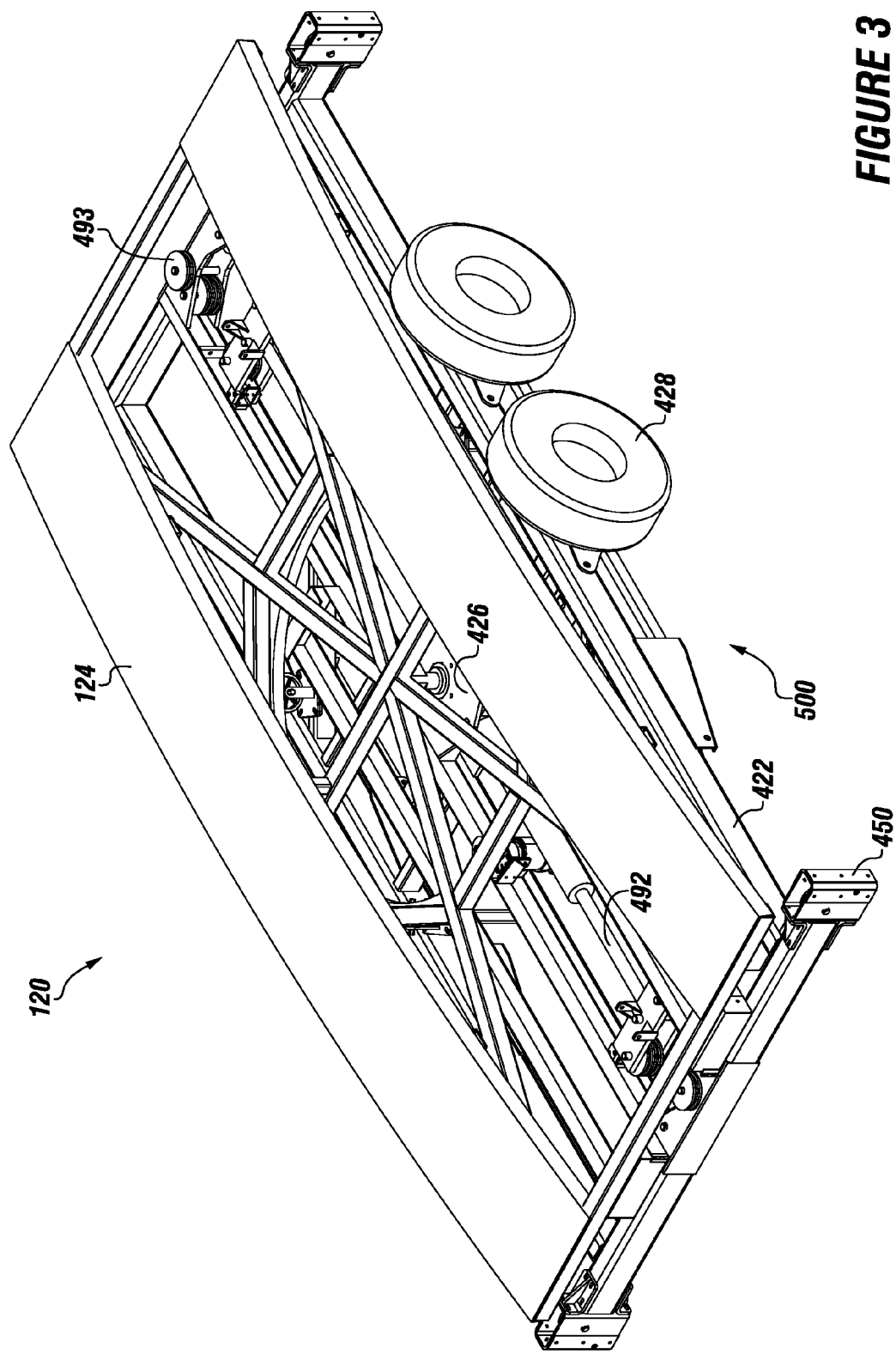
FIG. 3 depicts a top view of a trailer assembly according to one or more embodiments.
Figure 4:
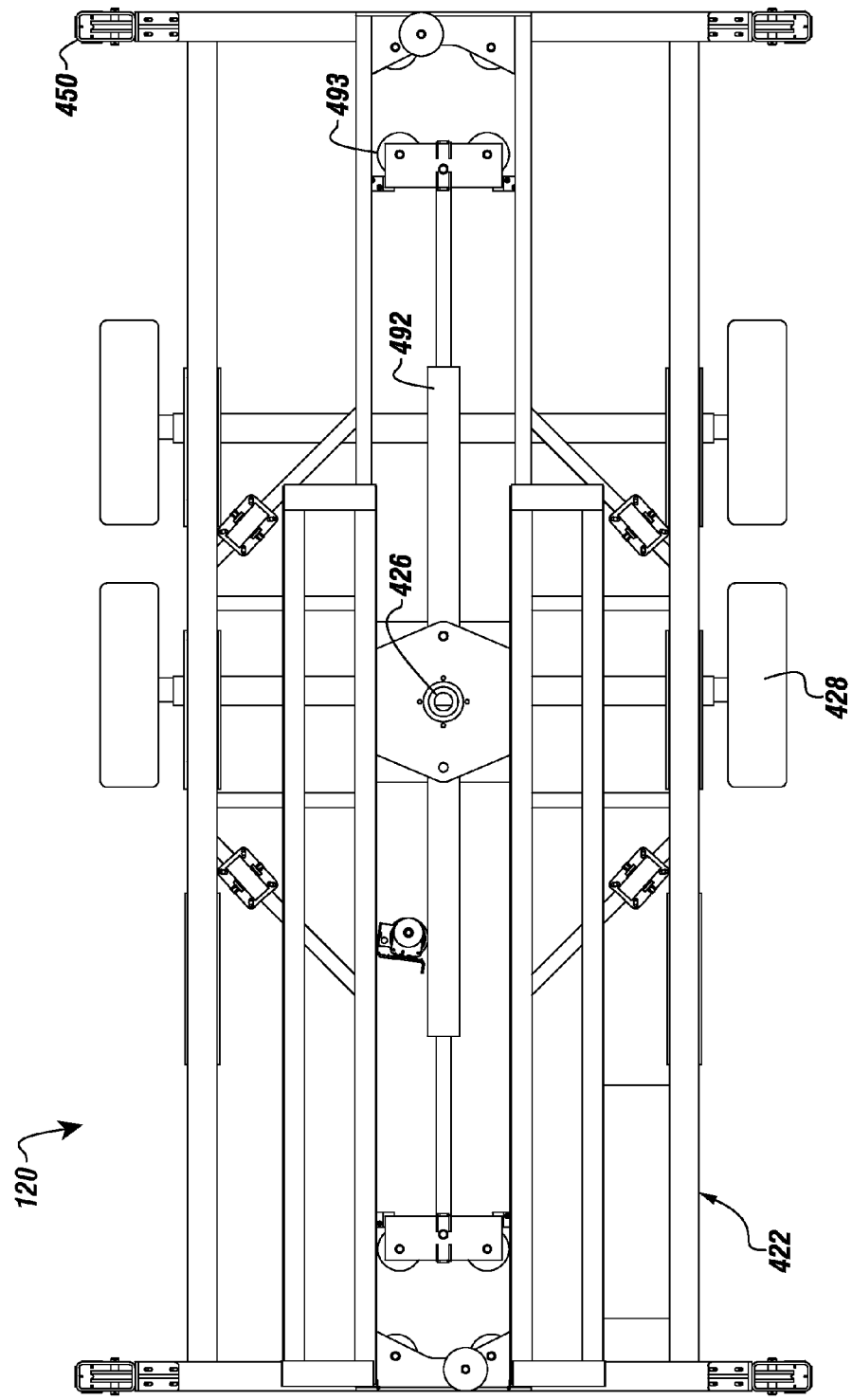
FIG. 4 depicts a bottom view of the trailer assembly of FIG. 3.

FIG. 3 depicts a top perspective view of the trailer assembly 120, and FIG. 4 depicts a bottom view of the trailer assembly. Referring now to FIGS. 3 and 4, the trailer assembly 120 can include the turntable 124, which is shown in FIG. 3, one or more plungers 492, one or more pulleys 493, one or more wheels 428, one or more rotators 426, one or more guides 450, and a trailer frame 422.

The plungers 492 and the pulleys 493 can be used to lift the trailer assembly 120 relative to the outer housing. The guides 450 can be connected to the trailer frame 422 and can receive the posts. The guides 450 can slide or move about the posts as the trailer assembly 120 is moved vertically.

The wheels 428 can support the trailer frame 422. The wheels 428 can be connected to the trailer frame 422 by one or more wheel lock systems 500, which is shown in FIG. 3.

FIG. 3, further shows the turntable 124 depicted having an arched shape. The turntable 124 can be connected to the rotator 426.

FIGS. 5A and 5B depict a side view of a wheel lock system 500. The wheel lock system 500 can include a first rod 520, a second rod 530, and one or more brackets 510. The brackets 510 can be configured to selectively secure about a hub or a portion of the wheels. The first rod 520 can be connected to two brackets disposed about adjacent wheels. The second rod 530 can be connected to the first rod 520.

In operation, when the trailer assembly 120 is being transported, the wheel lock system 500 can maintain the wheels in a deployed position, as shown in FIG. 5A. Once the trailer assembly 120 is placed at a location, the wheel lock system 500 can be actuated to allow the wheels to be placed in a retracted position, as shown in FIG. 5B. To use the wheel lock system 500, the trailer assembly 120 can be jacked up and one or more pins can be removed to allow the wheels to move freely, and the trailer assembly 120 can be lowered to allow the wheels to retract. To put the wheels in a deployed position, the trailer assembly 120 can be jacked up and the pins can be reinserted to maintain the wheels in the deployed position.

In one or more embodiments, the wheel lock system 500 can be at least partially operated using a hydraulic system. The hydraulic system can be used to deploy or retract the wheels. For example, the wheels can be connected to one or more hydraulic cylinders, and the hydraulic cylinders can be extended to push the wheels into a deployed position, and refracted to place the wheels in a retracted position.

While these embodiments have been described with emphasis on the embodiments, it should be understood that within the scope of the appended claims, the embodiments might be practiced other than as specifically described herein.

What is claimed is:

1. A mobile vehicle display device comprising:
   a. a trailer assembly comprising:
      (i) a trailer frame;
      (ii) a turntable disposed on a portion of the trailer frame;
      (iii) a rotator adapted to rotate the turntable; and
      (iv) a wheel adapted to support the trailer assembly; and
   b. an outer housing connected to at least a portion of the trailer assembly, wherein the trailer assembly is adapted to move vertically relative to the outer housing, and wherein the outer housing comprises a hinged wall adjacent to a removable hitch.

2. The apparatus of claim 1, wherein the removable hitch is secured to a portion of the trailer assembly.

3. The apparatus of claim 1, wherein the outer housing comprises four corners, and wherein a post is located at each corner.

4. The apparatus of claim 3, wherein the outer housing comprises four walls at least partially supported by the posts.

5. The apparatus of claim 4, wherein at least two of the walls each have a hinged portion, and wherein the hinged portions are aligned with one another to allow a person to open a door of a vehicle to exit the vehicle when disposed on the turntable and when the trailer assembly is in a down position.

6. The apparatus of claim 4, wherein one of the walls has a hinged portion.

7. The apparatus of claim 3, wherein the trailer frame has four corners, and wherein each corner has a guide.

8. The apparatus of claim 7, wherein each guide is engaged with at least a portion of one of the posts, and wherein each guide is configured to move vertically about one of the posts.

9. The apparatus of claim 3, further comprising a light assembly secured to one of the posts, wherein the light assembly comprises a light and a light fixture that is retractable for transportation.

10. The apparatus of claim 9, further comprising a light controller configured to selectively actuate the light.

11. The apparatus of claim 1, wherein the turntable has an arched configuration.

12. The apparatus of claim 1, further comprising a plurality of connectors disposed on the outer housing, wherein each connector is configured to secure an object to at least a portion of the outer housing.

13. The apparatus of claim 1, further comprising a digital display system formed in at least a portion of the outer housing.

14. The apparatus of claim 1, wherein the rotator is configured to slip when counter torque on the turntable is above a predetermined value.

15. The apparatus of claim 1, further comprising a control disposed on the outer housing.

16. The apparatus of claim 1, further comprising a lift system selected from the group consisting of: a scissor lift, a center lift, one or more telescoping hydraulic cylinders, a jack, a block and tackle lift, a rack and pinion lift, or the like.

17. The apparatus of claim 1, wherein each corner of the trailer assembly further comprises a leveling arm connected thereto, and wherein the leveling arms are configured to level the trailer assembly when deployed.

18. A method for loading and lifting a vehicle comprising:
   a. positioning and leveling a mobile vehicle display device, wherein the mobile vehicle display device comprises:
      (i) a trailer assembly comprising: a trailer frame, a turntable disposed on a portion of the trailer frame, a rotator adapted to rotate the turntable, and a wheel adapted to support the trailer assembly; and
      (ii) an outer housing connected to at least a portion of the trailer assembly, wherein the trailer assembly is adapted to move vertically relative to the outer housing;
   b. opening a door of the outer housing adjacent to a removable hitch disposed on the trailer assembly;
   c. positioning two ramps adjacent to the door, wherein the two ramps are adapted to allow the vehicle to be positioned on the turntable;
   d. driving the vehicle through the door of the outer housing adjacent to the removable hitch;
   e. centering the vehicle on the turntable;
   f. removing the two ramps from the trailer assembly;
   g. elevating the vehicle; and
   h. actuating the rotator to rotate the turntable allowing for three hundred and sixty degrees of rotation of the vehicle.

19. A mobile vehicle display device comprising:
   a. an outer housing comprising:
      (i) a first corner;
      (ii) a second corner;
      (iii) a third corner;
      (iv) a fourth corner;
      (v) a first post located at the first corner;
      (vi) a second post located at the second corner;
      (vii) a third post located at the third corner;
      (viii) a fourth post located at the fourth corner; and
      (ix) four walls at least partially supported by the posts, wherein at least one of the four walls has a hinged portion;
   b. a trailer assembly connected with the outer housing, wherein the trailer assembly is configured to move vertically relative to the outer housing, and wherein the trailer assembly comprises:
      (i) a trailer frame;
      (ii) a turntable disposed on a portion of the trailer frame; and
      (iii) a rotator adapted to rotate the turntable; and
   c. one or more leveling arms connected to the trailer assembly, wherein the one or more leveling arms are configured to level the trailer assembly when deployed.

20. The apparatus of claim 19, further comprising a plurality of guides connected with the trailer frame, wherein the plurality of guides engage the posts, and wherein the plurality of guides move along the posts as the trailer assembly is moved vertically relative to the outer housing.

* * * * *